US009840120B1

(12) United States Patent
Alhazza et al.

(10) Patent No.: US 9,840,120 B1
(45) Date of Patent: Dec. 12, 2017

(54) POSITIONABLE TOWING HITCH

(71) Applicant: KUWAIT UNIVERSITY, Safat (KW)

(72) Inventors: Khaled Ahmed Alhazza, Safat (KW);
Al-Hussain Ali Othman, Safat (KW);
Mahmoud Ahmed Hussain, Safat
(KW); Abdulla Turky Al-Enzi,
Al-Andalous (KW); Abduljaleel Khalid
Al-Shamouty, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 15/220,318

(22) Filed: Jul. 26, 2016

(51) Int. Cl.
B60D 1/40 (2006.01)
B60D 1/44 (2006.01)
B60D 1/46 (2006.01)

(52) U.S. Cl.
CPC .......... B60D 1/40 (2013.01); B60D 1/44 (2013.01); B60D 1/46 (2013.01)

(58) Field of Classification Search
CPC .......... B60D 1/40; B60D 1/44; B60D 1/46
USPC .................. 280/488, 489, 491.1, 490.1
See application file for complete search history.

(56) References Cited

U.S. PATENT DOCUMENTS 2,804,316 A   8/1957  Derksen
4,946,182 A   8/1990  Weber
5,560,628 A * 10/1996 Horn ............... B60P 3/125
                                             280/402
6,003,892 A * 12/1999 Henson ............ B60D 1/46
                                             254/420
D629,388 S    12/2010 Ceccarelli et al.
2002/0185838 A1 12/2002 Shilitz et al.
2003/0132605 A1 7/2003 Wiers
2005/0062257 A1* 3/2005 Donze ............. B60D 1/44
                                             280/490.1
2010/0038882 A1 2/2010 Chimento et al.
2011/0241311 A1* 10/2011 Wergin ............ B60D 1/36
                                             280/491.2
2017/0079191 A1* 3/2017 Cunningham ..... A01B 63/023

FOREIGN PATENT DOCUMENTS

DE    1020080277874    12/2009

OTHER PUBLICATIONS

"Trailer tow hitch, electrically pivoted," BMW Fans website.

* cited by examiner

Primary Examiner — Tony H Winner
Assistant Examiner — Marlon A Arce
(74) Attorney, Agent, or Firm — Richard C. Litman

(57) ABSTRACT

The positionable towing hitch includes a first beam supporting a movable housing assembly and a second beam assembly movable in the housing. The first beam protrudes out of the housing for mounting to a hitch receiver of a vehicle. A first beam driver assembly is coupled to the first beam to selectively extend and retract the housing with respect to the first beam in a horizontal direction. A second beam driver assembly is coupled to a second beam to selectively raise and lower the second beam with respect to the housing in a vertical direction. A ball mount bracket is fixed to the second beam for mounting a ball mount thereon to move with the second beam. The movements of the housing and the second beam facilitate positioning of the ball mount for connection to a trailer to be hitched.

18 Claims, 7 Drawing Sheets

POSITIONABLE TOWING HITCH

BACKGROUND OF THE INVENTION

1. Field of the Invention

The present invention relates to towing accessories, and particularly to a positionable towing hitch that easily positions the hitch relative to a trailer for mounting the trailer thereon.

2. Description of the Related Art

A variety of trailer hitches are available in the art. Such hitches generally require some physical effort to mount onto a vehicle, and then to a trailer, which can be a time-consuming process. Some of this effort is due to the stationary nature of the hitch itself when mounted to a vehicle, as well as the cumbersome bulk and weight of the trailer to be mounted. Moreover, most conventional hitches do not have any adjustment functionality, or very limited capacity for the same. The former results in much time-consuming physical effort, since the user must maneuver the trailer onto the ball mount of the hitch. Depending on the weight of the trailer, this is strenuous and difficult.

Thus, a positionable towing hitch solving the aforementioned problems is desired.

SUMMARY OF THE INVENTION

The positionable towing hitch includes a first beam supporting a movable housing assembly and a second beam assembly movable in the housing. The first beam protrudes out of the housing for mounting to a hitch receiver of a vehicle. A first beam driver assembly is coupled to the first beam to selectively extend and retract the housing with respect to the first beam in a horizontal direction. A second beam driver assembly is coupled to a second beam to selectively raise and lower the second beam with respect to the housing in a vertical direction. A ball mount bracket is fixed to the second beam for mounting a ball mount thereon to move with the second beam. The movements of the housing and the second beam facilitate positioning of the ball mount for connection to a trailer to be hitched.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
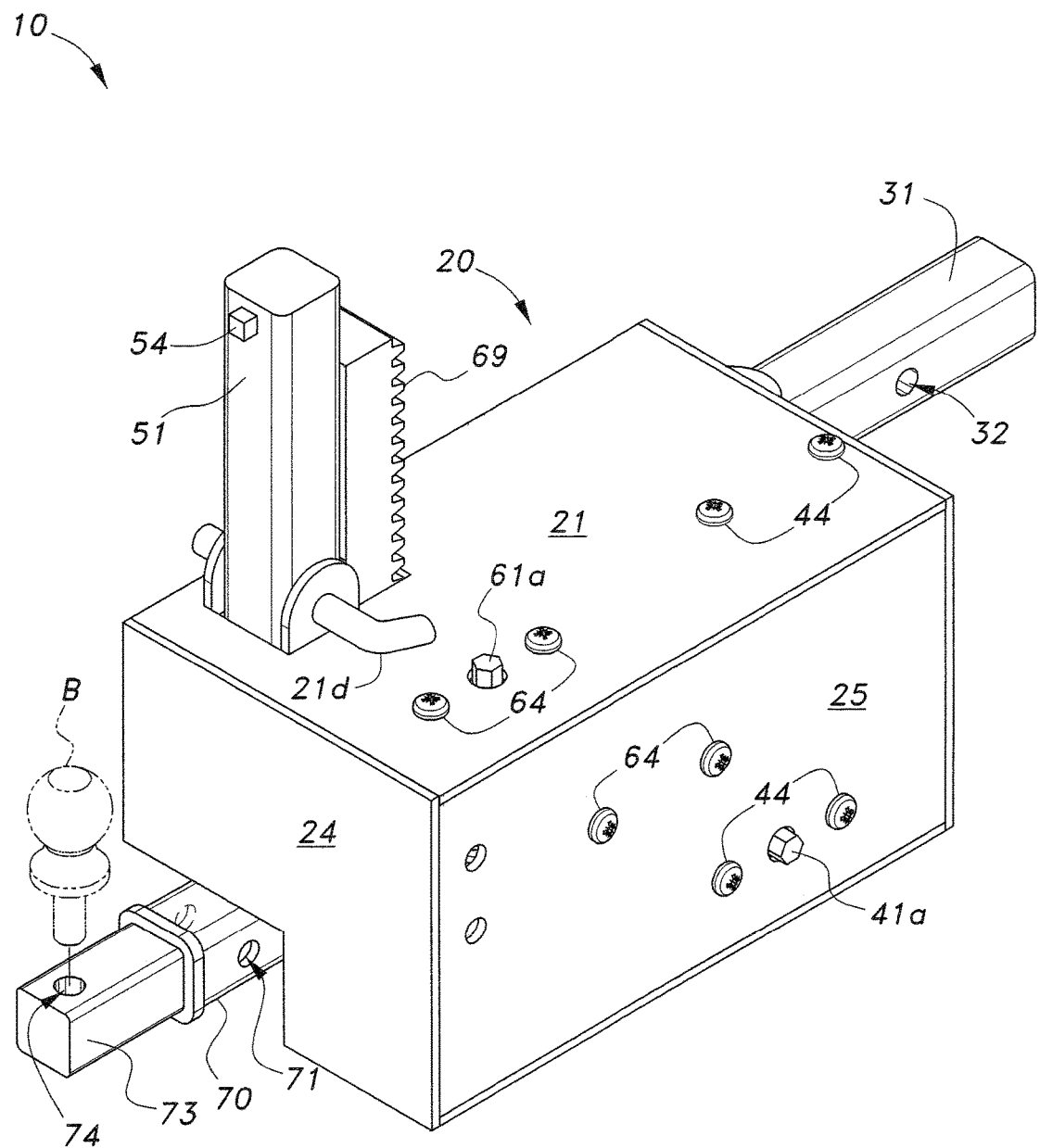
FIG. 1A is an environmental perspective view of a positionable towing hitch according to the present invention as seen from the front.

The positionable towing hitch, generally referred to by the reference number 10 in the Figures, provides horizontal and vertical positioning of the hitch 10 to easily mount the hitch 10 to a trailer. As best seen in FIGS. 1A-4, the positionable towing hitch 10 includes a casing or housing 20, a first bar or beam assembly 30, and a movable second bar or beam assembly 50.

Figure 4:
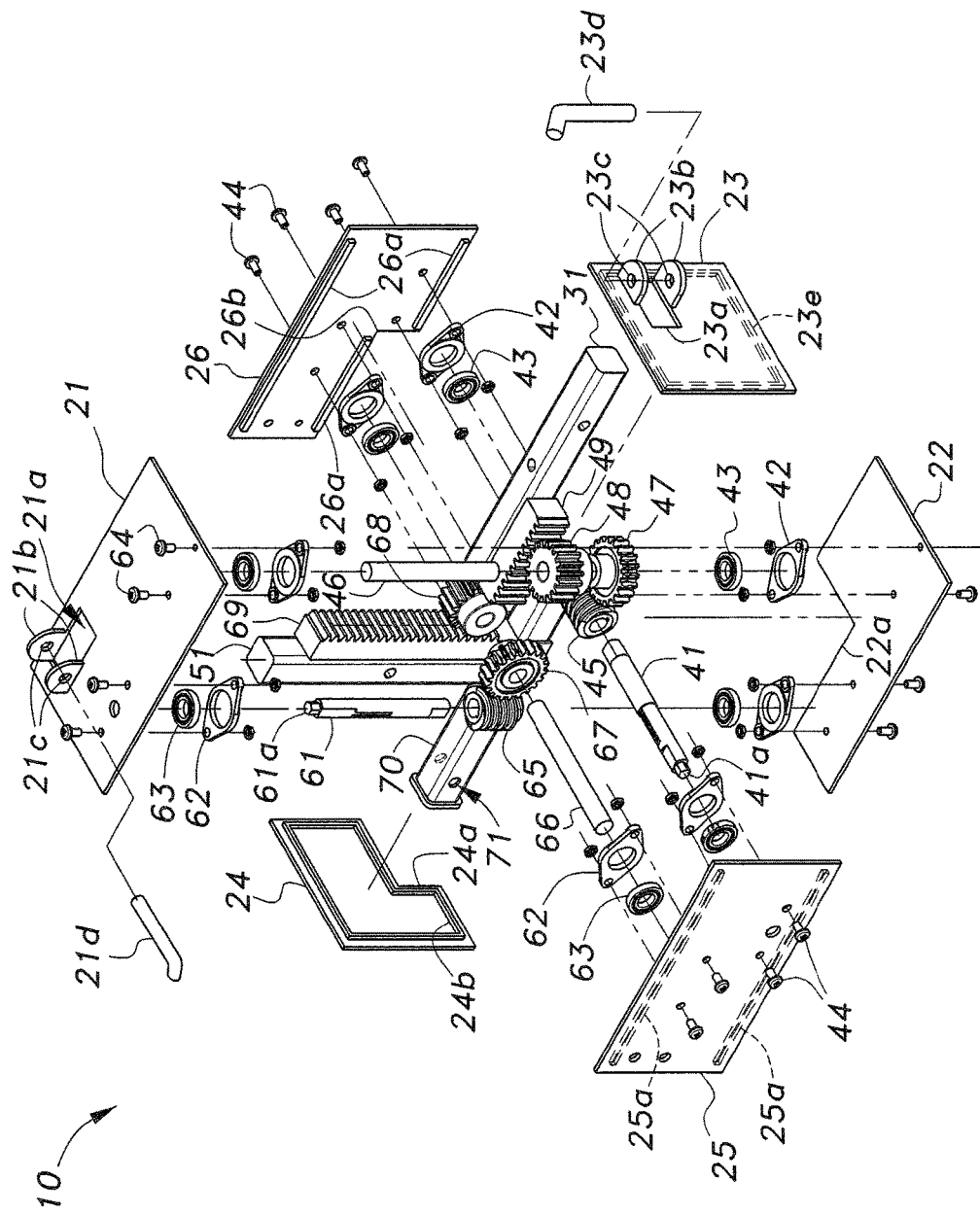
FIG. 4 is an exploded perspective view of the positionable towing hitch of FIG. 1A, shown with guides, stops, and interior panels omitted.

The housing 20 is preferably an elongate, rectangular box construction having an upper or top panel 21, a lower or bottom panel 22, a front end panel 24, a back end panel 23, and opposing side panels 25, 26. As best seen in FIG. 4, the side panel 25 has elongate upper and lower support flanges 25a to support a side edge of the top panel 21 and the bottom panel 22, respectively, when assembled. The opposing side panel 26 also has similar elongate support flanges 26a at the upper and lower regions to support the opposite side edge of the top panel 21 and the bottom panel 22. Each front end panel 24 and back end panel 23 also has respective support flanges 24b and 23e to support opposite ends of the top panel 21 and the bottom panel 22. Besides providing support, the support flanges 25a, 26a, 24b, 23e also define a frame for the housing 20, which strengthens the structure thereof.

The first beam assembly 30 enables adjustable mounting of the positionable towing hitch 10 into a hitch receiver on the vehicle. The first beam assembly 30 is disposed near the rear half of the housing 20 and includes an elongate first bar or beam 31 coupled to a first beam driver assembly 40. The first beam 31 protrudes out of the housing 20 through a first beam opening 23a on the back end panel 23. In use, the first beam 31 is fixed in position on the hitch receiver. Operation of the first beam driver assembly 40 causes the housing 20 to extend and retract with respect to the fixed first beam 31, and thereby adjust the relative horizontal position of the positionable towing hitch 10 towards the trailer. The extendable and retractable movement of the housing 20 can also be referred to as reciprocating movement.

The first beam 31 is preferably an elongate, square, preferably solid bar having a pair of opposing first locking holes 32 near the distal end. The distal end of the first beam 31 is configured to be insertably mounted to a corresponding hitch receiver of the vehicle. A square or polygonal solid bar is preferred to facilitate secure attachment of the first beam 31 and substantially eliminate any concerns of rotational movement within the receiver. A typical hitch receiver usually includes corresponding locking holes so that the first beam 31 may be secured to the receiver by a hitch pin inserted through the aligned locking holes. Tubular bars may also be used as long as they can withstand the stresses of towing a load.

Figure 3:
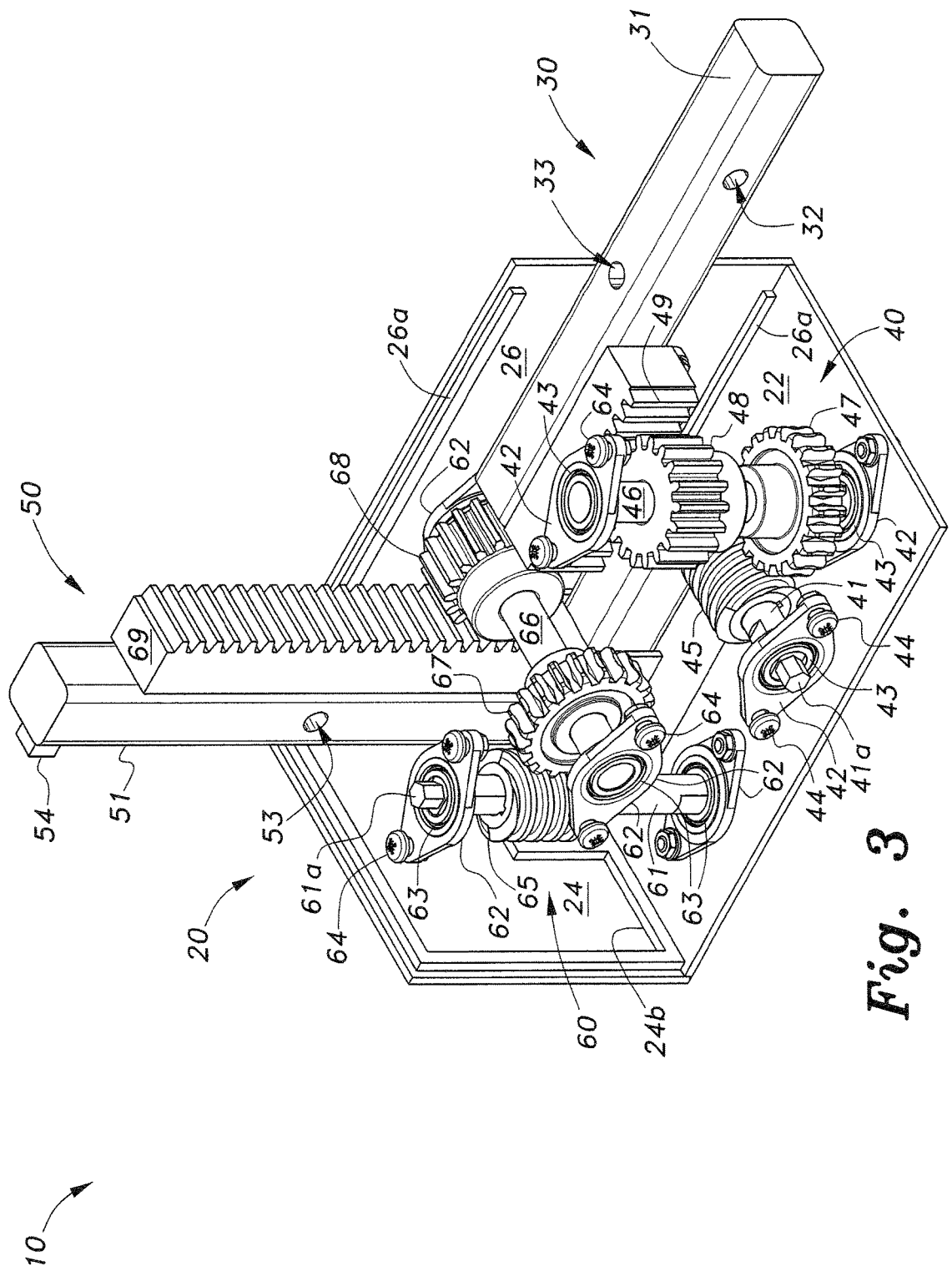
FIG. 3 is a perspective view of the positionable towing hitch shown of FIG. 1A, shown with some of the housing panels removed.

As shown in FIG. 3, the first beam 31 also includes a pair of opposing second locking holes 33 disposed in orthogonal relation to the first locking holes 32 and spaced therefrom along the length of the first beam 31. The second locking holes 33 are preferably formed about midway along the length of the first beam 31. The position of the second locking holes 33 is preselected to set a normal initial position of the housing 20 with respect to the first beam 31. As shown in FIG. 4, the back end panel 23 is provided with a pair of spaced brackets 23b extending outwardly from the top and bottom of the first beam opening 23a, each bracket 23b having a hole 23c formed therein. When reciprocated positioning of the housing 20 is finalized, the second locking holes 33 are aligned with the holes 23c in the brackets 23b, and a locking pin 23d is inserted through the aligned holes 23c, 33 to secure the housing 20 in place on the first beam 31.

Figure 5:
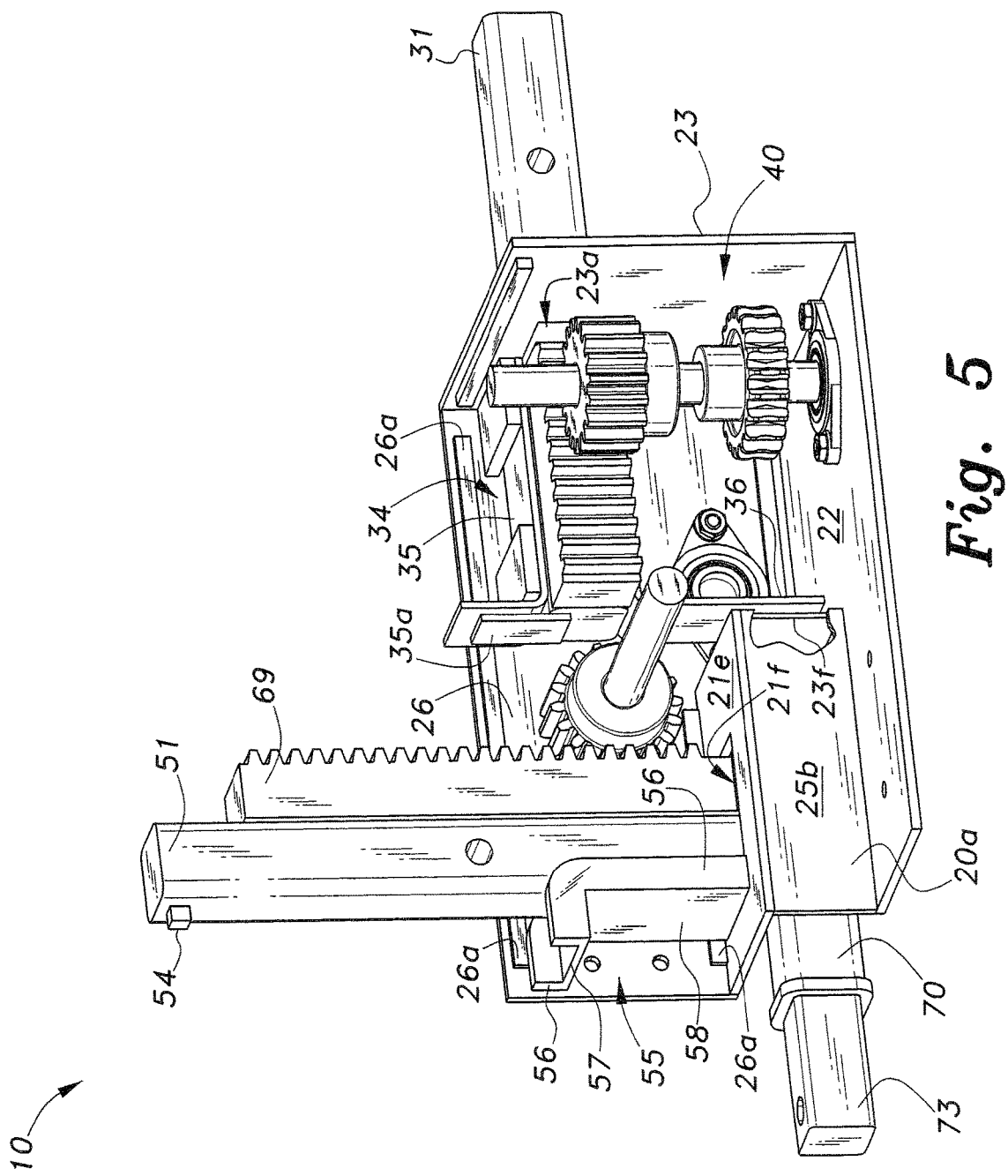
FIG. 5 is a partial perspective view of an alternative embodiment of a positionable towing hitch according to the present invention, shown partially assembled with components removed and broken away for clarity to show guides and other additional features.

To support the reciprocating movements of the housing 20 with respect to the first beam 31, the first beam assembly 30 may include a first beam guide 34. As shown in FIG. 5, the first beam guide 34 slidably supports the first beam 31 within the housing 20 and includes a generally elongate, upper guide rail angle 35 and a generally elongate, lower guide rail angle 36 spaced from the upper guide rail 35 to form a channel therebetween. The channel slides over the first beam 31 to move the housing 20 when the gears in the drive assembly 40 are actuated, as described below.

The upper guide rail 35 is provided as a generally L-shaped angle disposed inside the housing 20. One leg section or horizontally disposed section of the upper guide rail 35 defines the general length of travel for the first beam 30. The other leg section or vertically disposed section extends upward from one end of the horizontally disposed section and provides structural support by terminating at the underside of the top panel 21. The vertically disposed section may be provided with an elongate abutment stop 35a extending downward into the channel, at least partially. The abutment stop 35a prevents the first beam 31 from extending past the length of the horizontal section at one end.

The lower guide rail 36 is provided as a generally L-shaped angle disposed in mirror opposite relation with respect to the upper guide rail 35 within the housing 20. As with the upper guide rail 35, one leg section or horizontally disposed section of the lower guide rail 36 defines the general length of travel for the first beam 31, while the other leg section or vertically disposed section extends downward to provide structural support by terminating at the topside of the bottom panel 22.

The first beam driver assembly 40 is disposed inside the housing 20 and includes a gear drive shaft 41 extending between the side panels 25, 26. A bracket 42 is securely mounted to the inner side of each side panel 25, 26 by fasteners 44, such as nuts and bolts and the like. Each bracket 42 includes an annular bearing 43 mounted therein to rotatably support respective ends of the gear drive shaft 41. A worm 45 is rigidly mounted to the gear drive shaft 41, and a drive nut 41a extends from one end of the gear drive shaft 41 out of the housing 20. In this instance, the drive nut 41a protrudes from the side panel 25. It is also recognized that the drive nut 41a can extend from the opposite side panel 26. The drive nut 41a enables a tool or a motor to be attached thereon to drive the gear drive shaft 41 and thereby rotate the worm 45.

A rotating gear transmission shaft 46 extends between the top panel 21 and the bottom panel 22 in orthogonal relation with respect to the gear drive shaft 41. Similar to the gear drive shaft 41, a bracket 42 is securely mounted to the inner side of each top panel 21 and bottom panel 22 by fasteners 44. Each bracket 42 includes an annular bearing 43 mounted therein to rotatably support respective ends of the gear transmission shaft 46. A worm gear 47 is rigidly mounted to the gear transmission shaft 46 and meshed with the worm 45. A spur gear or pinion 48, spaced from the worm gear 47, is also rigidly mounted to the gear transmission shaft 46. An elongate rack or rack gear 49 is rigidly mounted to the first beam 31, and the teeth thereof mesh with the teeth of the pinion 48. The fixed mounting of the rack 49 can be by welding and the like.

Figure 1B:
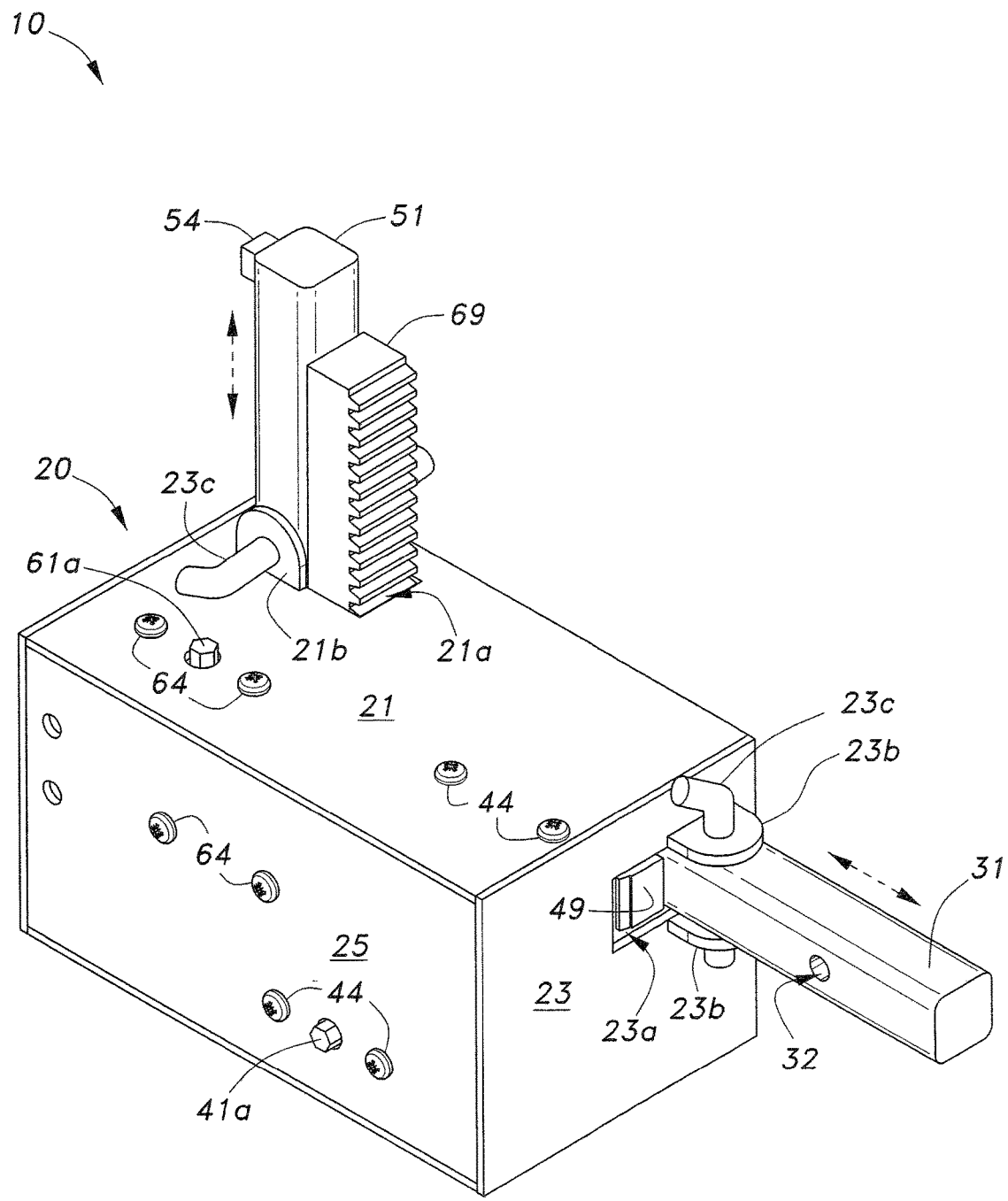
FIG. 1B is an environmental perspective view of the positionable towing hitch of FIG. 1A as seen from the rear.
Figure 2:
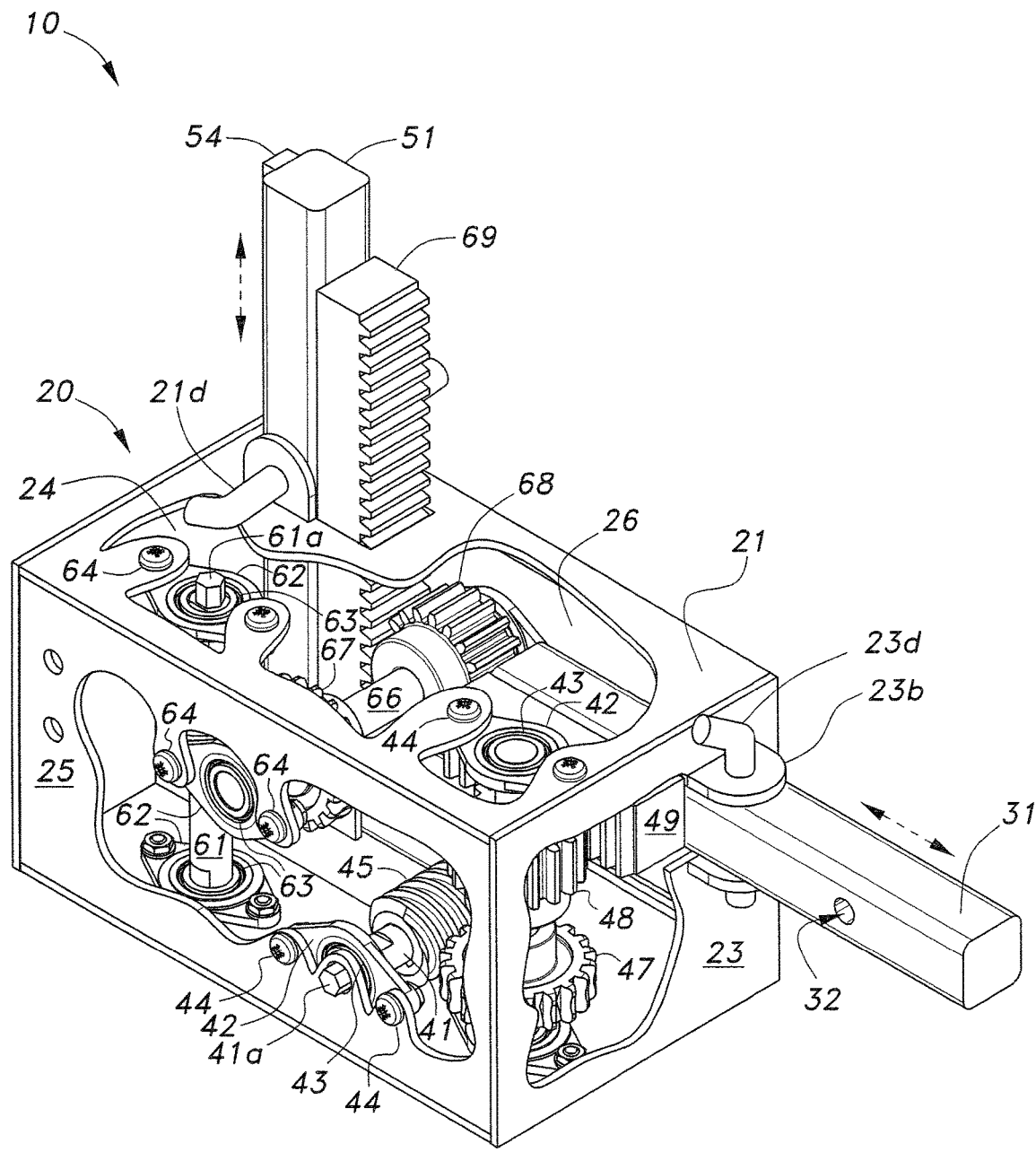
FIG. 2 is a perspective view of the positionable towing hitch of FIG. 1A, shown with the housing broken away to show details thereof.
Figure 6:
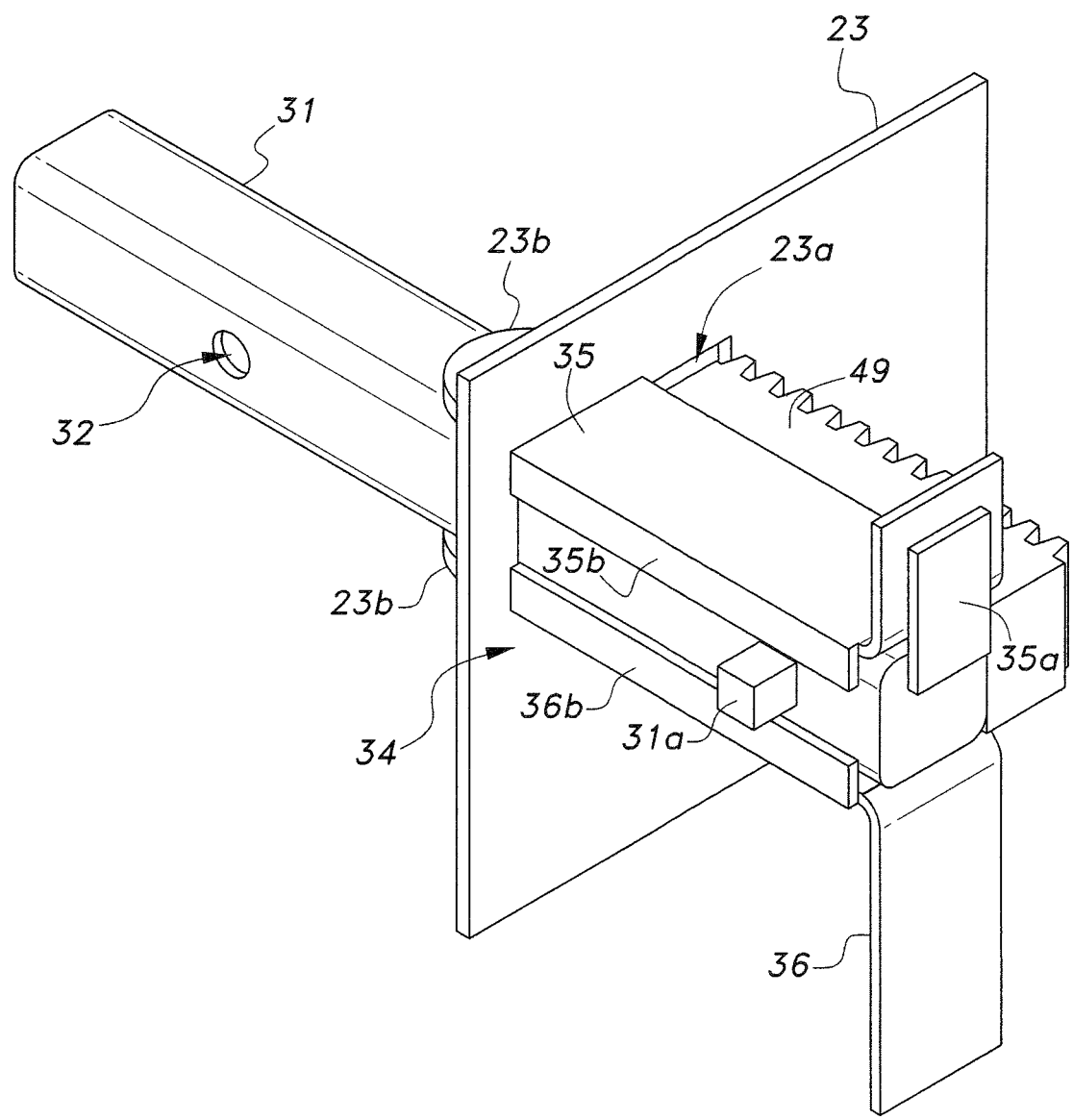
FIG. 6 is a perspective view of the rear section of the positionable towing hitch of FIG. 1A with most panels and assemblies removed to show details of a back end panel, a first beam guide, and a first beam with associated rack slidable within the first beam guide.

As can be seen from the above description, the first beam 31 and the rack 49 fixed thereto results in a relatively thick or wide combined structure. Therefore, the first beam opening 23a is relatively wide to accommodate the reciprocating movements of the first beam 31 and the rack 49 into and out of the housing 20, as can be seen in FIGS. 1B, 5, and 6. If the first beam opening 23a is not suitably wide, then the first beam opening 23a would block movement of the rack 49 out of the housing 20 and limit the desired or preselected range of adjustable mounting of the positionable towing hitch 10.

Similarly, the first beam 31 also includes a stop 31a extending from one end, as best seen in FIG. 6. The stop 31a prevents the first beam 31 from inadvertently or unintentionally sliding out of the housing 20 during use. Moreover, the stop 31a defines the extent of reciprocating adjustments of the first beam 31, i.e., the stop 31a limits how far the first beam 31 may extend out of the housing 20. The upper guide rail 35 and the lower guide rail 36 may be provided with an upper guide flange 35b and a lower guide flange 36b, respectively. The upper guide flange 35b extends downward and the lower guide flange 36b extend extends upward to define a guideway therebetween. This guideway supports reciprocating slidable movements of the stop 31a as the first beam 31 and the rack 49 move during use.

In use, rotation of the gear drive shaft 41 rotates the worm 45 about the axis of the gear drive shaft 41. The worm 45 drives the meshed worm gear 47 causing the worm gear 47 to rotate about an axis perpendicular to the axis of rotation of the gear drive shaft 41. Since the pinion 48 is also fixed on the gear transmission shaft 46, rotation of the worm gear 47 concurrently rotates the pinion 48, causing the intermeshed rack 49 to extend or retract the housing 20 on the first beam 31. This gearing arrangement permits relatively low torque to be applied to the gear drive shaft 41 to actuate positional movements of the housing 20, which places minimal physical or mechanical strain on the user. The rack 49 may be relatively short in length, preferably about one-half or less than one-half the length of the first beam 31, since the range of movement for the first beam 31 is confined by the abutment stop 35a and the stop 31a.

The movable second beam assembly 50 enables adjustable, vertical positioning of a ball mount B selectively mounted thereon. The movable first beam assembly 50 is disposed near the front half of the housing 20 and includes an elongate second bar or beam 51 coupled to a second beam driver assembly 60. The second beam 51 protrudes out of the housing 20 through a second beam opening 21a on the top panel 21. The second beam driver assembly 60 selectively extends and retracts the second beam 51 with respect to the housing 20 to adjust the relative vertical position of the attached ball mount B. The extendable and retractable movement of the second beam 51 can also be referred to as reciprocating movement.

The second beam 51 is preferably an elongate, square, preferably solid bar having a pair of opposing locking holes 53 near the middle. The position of the locking holes 53 is preselected to set the normal, initial position of the second beam 51 from the housing 20. As shown in FIG. 4, the top panel 21 is provided with a pair of spaced brackets 21b extending outward from the sides of the second beam opening 21a, each bracket 21b having a hole 21c formed therein. When reciprocated positioning of the second beam 51 is finalized, the second locking holes 53 are aligned with the holes 21c in the brackets 21b, and a locking pin 21d is inserted through the aligned holes 21c, 53 to secure the second beam 51 in place. A stop 54 extends from the distal end of the second beam 51, the purpose of which will be further described below. Tubular bars may also be used as long as they can withstand operational stresses.

The second beam driver assembly 60 is disposed inside the housing 20 and includes a gear drive shaft 61 extending between the top panel 21 and the bottom panel 22. A bracket 62 is securely mounted to the inner side of each top panel 21 and bottom panel 22 by fasteners 64, such as nuts and bolts and the like. Each bracket 62 includes an annular bearing 63 mounted therein to rotatably support respective ends of the gear drive shaft 61. A worm 65 is rigidly mounted to the gear drive shaft 61, and a drive nut 61a extends from one end of the gear drive shaft 61 out of the housing 20. In this instance, the drive nut 61a protrudes from the top panel 21. It is also recognized that the drive nut 61a can extend from the opposite bottom panel 22. The drive nut 61a enables a tool or a motor to be attached thereon to drive the gear drive shaft 61 and thereby rotate the worm 65.

A rotating gear transmission shaft 66 extends between the side panels 25, 26 in orthogonal relation with respect to the gear drive shaft 61. Similar to the gear drive shaft 61, a bracket 62 is securely mounted to the inner side of each side panel 25, 26 by fasteners 64. Each bracket 62 includes an annular bearing 63 mounted therein to rotatably support respective ends of the gear transmission shaft 66. A worm gear 67 is rigidly mounted to the gear transmission shaft 66 and meshed with the worm 65. A spur gear or pinion 68, spaced from the worm gear 67, is also rigidly mounted to the gear transmission shaft 66. An elongate rack or rack gear 69 is rigidly mounted to the second beam 61, and the teeth thereof mesh with the teeth on the pinion 68. The fixed mounting of the rack 69 can be by welding and the like.

In use, rotation of the gear drive shaft 61 rotates the worm 65 about the axis of the gear drive shaft 61. The worm 65 drives the meshed worm gear 67, causing the worm gear 67 to rotate about an axis perpendicular to the axis of rotation of the gear drive shaft 61. Since the pinion 68 is also fixed on the gear transmission shaft 66, rotation of the worm gear 67 concurrently rotates the pinion 68, causing the intermeshed rack 69 to extend or retract the second beam 51. This gearing arrangement permits relatively low torque to be applied to the gear drive shaft 61 to actuate vertical positional movements of the second beam 51, which places minimal physical or mechanical strain on the user.

To support the ball mount B, the second beam 51 includes an elongate ball mount bracket 70 rigidly mounted to the bottom of the second beam 51, the ball mount bracket 70 extending orthogonal to the second beam 51. This configuration forms a general inverted T-shaped beam. The ball mount bracket 70 is preferably an elongate, square tubular bar dimensioned to slidably receive an extension bar 73. One or more pairs of opposing locking holes 71 are provided on the ball mount bracket 70 to secure the extension bar 73 therein. A threaded mounting hole 74 is provided near the distal end of the extension bar 73 for mounting the ball mount B. It is noted, however, that any type of towing hitch can be attached to the extension bar 73.

The second beam 51 is configured with a longer range of positionable movement compared to the relative movements between the housing 20 and the first beam 31. Thus, the rack 69 extends substantially the length of the second beam 51, which is also correspondingly longer than the rack 49 for the first beam 31. Since the height of the housing 20 is shorter than the height of the rack 69, the second beam opening 21a is relatively wide or long, depending on perspective, to accommodate the total combined width or length of the second beam 51 and the rack 69 thereon, i.e., the overall back-to-back arrangement of the second beam 51 and the rack 69. The relatively short height of the housing 20 cannot permit the full range of vertical movement of the second beam 51 if there is no means to allow vertical movement of the second beam 51 and the connected ball mount bracket 70. Thus, the front end panel 24, the side panel 26, and the bottom panel 22 include a front panel corner cutout 24a, a side panel corner cutout 26b, and a bottom panel cutout 22a, respectively, which together define a pass-through opening for unobstructed vertical movement of the second beam 51 and the connected ball mount bracket 70.

Due to the weight of the second beam 51 and the connected ball mount bracket 70, some additional support may be required. Therefore, the positionable towing hitch 10 also includes a second beam guide 55 disposed inside the housing 20 between the front end panel 24 and a sub-housing 20a. As best seen in FIG. 5, the sub-housing 20a encloses the pass-through opening of the housing 20 mentioned above and surrounds the bottom portion of the second beam 51, i.e., the ball mount bracket 70. The sub-housing 20a includes a top panel 21e, a side panel 25b, and a back end panel 23f.

The top panel 21e of the sub-housing 20a extends from the side panel 26 into the interior of the housing 20. One end of the top panel 21e is preferably welded to one of the support flanges 26a. A second beam opening 21f is formed on the top panel 21e and sized to permit the second beam 51 and the attached rack 69 to reciprocally move therethrough. The side panel 25b extends orthogonally from the opposite end of the top panel 21e and terminates on the top side of the bottom panel 22. The sides of the side panel 25b are preferably welded to the top panel 21e and the bottom panel 22, respectively. The back end panel 23f covers the back end of the top panel 21e and the side panel 25b and preferably welded thereon, as well as to the bottom panel 22 and the side panel 26. The panels 21e, 25b, 23f may also be constructed as a single, unitary structure of the housing 20 or a separate unitary structure to attached to the housing 20.

The second beam guide 55 is preferably an guide rail angle having one end attached to the front end panel 24 of the housing 20 and the opposite end attached to the second beam opening 21f on the sub-housing 20a. The second beam guide 55 is provided with a pair of angled and spaced guide sidewalls 56 and a guide web 58 interconnecting the guide sidewalls 56 to form a channel therebetween. One side of the second beam 51 slides within this channel during adjustable movements thereof along a vertical section of the second beam guide 55. A horizontal section of the second beam guide 55 is also provided with an interconnecting intermediate guide web 57 that structurally strengthens the horizontal section of the second beam guide 55. Additionally, the intermediate guide web 57 also serves as an abutment for the stop 54 on the second beam 51. In use, the stop 54 engages the intermediate guide web 57 and prevents the second beam 51 from fully exiting through the bottom of the housing 50 when lowering the second beam 51 during adjustments.

In use, the user inserts the first beam 31 into the hitch receiver on the vehicle. The first beam 31 is secured to the hitch receiver via the first locking holes 32. A tool or motor is connected to the drive nut 41a of the first beam driver assembly 40 to selectively extend or retract the housing 20 with respect to the first beam 31 to thereby adjust relative horizontal position of the housing 20 with respect to a trailer to be hitched. With the ball mount B attached to the ball mount bracket 70, the user connects a tool or motor to the drive nut 61a of the second beam driver assembly 60 to adjustably position the ball mount B below the receiving socket on the trailer. Either of the drive nuts 41a and 61a may be operated to fine tune the positioning of the ball mount B. Once positioned properly, the drive nut 61a is operated to raise the ball mount B into the socket of the trailer until securely engaged therewith. When the ball mount B has been seated properly, the second beam 51 can be raised or lowered until the locking holes 53 are aligned with the bracket holes 21c and fixed in place by the locking pin 21d. Similarly, the housing 20 can be extended or retracted until the second locking holes 33 are aligned with the bracket holes 23c and fixed in place by the locking pin 23d.

Thus, it can be seen that the positionable towing hitch 10 permits relatively easy positioning and connection to the trailer to be hitched. The gearing arrangement of the respective driver assemblies 40, 60 requires little physical effort or motor power to facilitate relative movements of the first beam 31 and the second beam 51, which substantially reduces the time and effort required in more conventional hitches.

It is to be understood that the positionable towing hitch 10 encompasses a variety of alternatives. For example, the various components of the positionable towing hitch 10 are preferably constructed from metal for durability and strength. However, other materials such as durable plastic, composites, and combinations thereof can also be used for some or all the components. The gearing arrangement for the driver assemblies 40, 60 can also be provided by other types and sizes of gears, such as bevel gears and the like.

It is to be understood that the present invention is not limited to the embodiments described above, but encompasses any and all embodiments within the scope of the following claims.

We claim:

1. A positionable towing hitch, comprising:
   a housing having a top panel, a bottom panel; a front end panel, a back end panel, and opposing side panels;
   a first beam assembly mounted in the housing, the first beam assembly having an elongate first beam protruding out of the housing;
   a first beam driver assembly coupled to the first beam to selectively extend and retract the housing with respect to the first beam in a horizontal direction, the first beam having a distal end adapted for mounting into a hitch receiver of a vehicle;
   a movable second beam assembly mounted in the housing, the movable second beam assembly having an elongate second beam protruding out of the housing;
   a second beam driver assembly coupled to the second beam to selectively raise and lower the second beam with respect to the housing in a vertical direction; and
   a ball mount bracket attached to the second beam, the ball mount bracket being adapted to mount a ball mount thereon;
   wherein selective operation of the first beam driver assembly and the second beam driver assembly positions the positionable towing hitch for connecting the ball mount to a trailer.

2. The positionable towing hitch according to claim 1, wherein:
   said front end panel has a front panel corner cutout;
   one of said side panels has a side panel corner cutout; and
   said bottom panel has a bottom panel corner cutout, the front panel corner cutout, the front panel corner cutout, and the side panel corner cutout defining a pass-through opening permitting vertical movement of said second beam and said ball mount bracket.

3. The positionable towing hitch according to claim 1, wherein said back end panel comprises:
   a first beam opening formed therein, said first beam protruding through the first beam opening; and
   a pair of spaced brackets extending outward above and below the first beam opening, each of the brackets having a hole defined therein.

4. The positionable towing hitch according to claim 3, wherein said first beam comprises:
   a pair of opposing first locking holes adjacent the distal end, the first locking holes being alignable with holes in the hitch receiver for receiving a locking pin;
   a pair of opposing second locking holes spaced from said first locking holes, the second locking holes being oriented orthogonal to the first locking holes; and
   a first beam locking pin selectively insertable through the second locking holes and the holes in the brackets on said back end panel when aligned to lock extension of said first beam.

5. The positionable towing hitch according to claim 4, wherein said first beam is an elongate, square solid bar.

6. The positionable towing hitch according to claim 3, further comprising a first beam guide disposed inside said housing, said first beam guide having a substantially elongate, upper guide rail angle and a substantially elongate, lower guide rail angle spaced from said upper guide rail angle defining a channel therebetween, the channel sliding over said first beam during relative movement between said housing and said first beam.

7. The positionable towing hitch according to claim 6, further comprising an abutment stop extending into said channel, said abutment stop limiting relative movement between said housing and said first beam within said housing.

8. The positionable towing hitch according to claim 1, wherein said first beam driver assembly comprises:
   an elongate rotating gear drive shaft extending between said opposing side panels, the gear drive shaft having a drive nut at one end extending out of one of said side panels, the drive nut being adapted for selective coupling to a drive mechanism;
   a bracket mounted to an inner side of each side panel;
   a bearing mounted in each of the side panel brackets, the bearings rotatably supporting the ends of the gear drive shaft;
   a worm rigidly mounted to the gear drive shaft;
   an elongate rotating gear transmission shaft extending between said top panel and said bottom panel in orthogonal to the gear drive shaft;
   a bracket mounted to an inner side of said top panel and said bottom panel;
   a bearing mounted in the brackets on said top panel and said bottom panel, the bearings rotatably supporting the ends of the gear transmission shaft;
   a worm gear rigidly mounted on the gear transmission shaft, the worm gear meshing with the worm;
   a pinion spaced from the worm gear and rigidly mounted on the gear transmission shaft; and
   an elongate rack rigidly mounted on said first beam, the pinion meshing with the rack;
   wherein selective rotation of the gear drive shaft concurrently rotates the gear transmission shaft to reciprocate the rack, thereby extending and retracting said housing with respect to said first beam.

9. The positionable towing hitch according to claim 8, further comprising fasteners for mounting said brackets to said panels.

10. The positionable towing hitch according to claim 1, wherein said top panel comprises:
   a second beam opening formed therein, said second beam protruding through the second beam opening; and
   a pair of spaced brackets extending outward from sides of the second beam opening, each of the brackets having a hole formed therein.

11. The positionable towing hitch according to claim 10, wherein said second beam comprises:
   a pair of opposing locking holes about midway along said second beam;
   a stop extending from one end of said second beam, the stop preventing said second beam from lowering fully into said housing; and
   a second beam locking pin selectively insertable through the second beam locking holes and the holes in the top panel brackets, when aligned, t lock extension of said second beam.

12. The positionable towing hitch according to claim 11, wherein said second beam is an elongate, square solid bar.

13. The positionable towing hitch according to claim 1, wherein said second beam driver assembly comprises:
   an elongate rotating gear drive shaft extending between said top panel and said bottom panel, the gear drive shaft having a drive nut at one end extending out of one of said housing, said drive nut being adapted for selective coupling to a drive mechanism;
   a bracket mounted to an inner side of said top panel and a bracket mounted to an inner side of said bottom panel;
   a bearing mounted in each of the brackets, the bearings rotatably supporting the ends of the gear drive shaft;
   a worm rigidly mounted to the gear drive shaft;
   an elongate rotating gear transmission shaft extending between said opposing side panels orthogonal to the gear drive shaft;
   a bracket mounted to an inner side of each said side panel;
   a bearing mounted in each of the side panel brackets, the bearings rotatably supporting the ends of the gear transmission shaft;
   a worm gear rigidly mounted to the gear transmission shaft, the worm gear meshing with the worm;
   a pinion spaced from the worm gear and rigidly mounted to the gear transmission shaft; and
   an elongate rack rigidly mounted to said second beam, the pinion meshing with the rack;
   wherein selective rotation of the gear drive shaft concurrently rotates the gear transmission shaft to reciprocate the rack, thereby raising and lowering said second beam with respect to said housing.

14. The positionable towing hitch according to claim 13, further comprising fasteners mounting said brackets to said panels.

15. The positionable towing hitch according to claim 1, wherein said ball mount bracket comprises an elongate, square tubular bar having at least one pair of opposing locking holes, the tubular bar having interior dimensions adapted to receive an extension bar of a ball mount therein.

16. The positionable towing hitch according to claim 1, further comprising an extension bar mounted to said ball mount bracket, the extension bar having a threaded mounting hole adapted for mounting the ball mount therein.

17. The positionable towing hitch according to claim 1, further comprising a sub-housing disposed inside said housing, said sub-housing having a top panel extending from one of said opposing side panels of said housing, a side panel extending orthogonally from one side of said top panel of the sub-housing and terminating at said bottom panel of said housing, and a back end panel covering back ends of said top panel and said side panel of said sub-housing, said top panel of said sub-housing having a second beam opening formed therein to permit passage of said second beam.

18. The positionable towing hitch according to claim 17, further comprising a second beam guide disposed inside said housing between the front panel of said housing and the second beam opening in said sub-housing, the second beam guide having a pair of spaced, angled guide sidewalls and a guide web interconnecting the guide sidewalls to thereby form a guide channel, said second beam sliding within said channel during movements thereof.

* * * * *